United States Patent Office 2,953,984
Patented Sept. 27, 1960

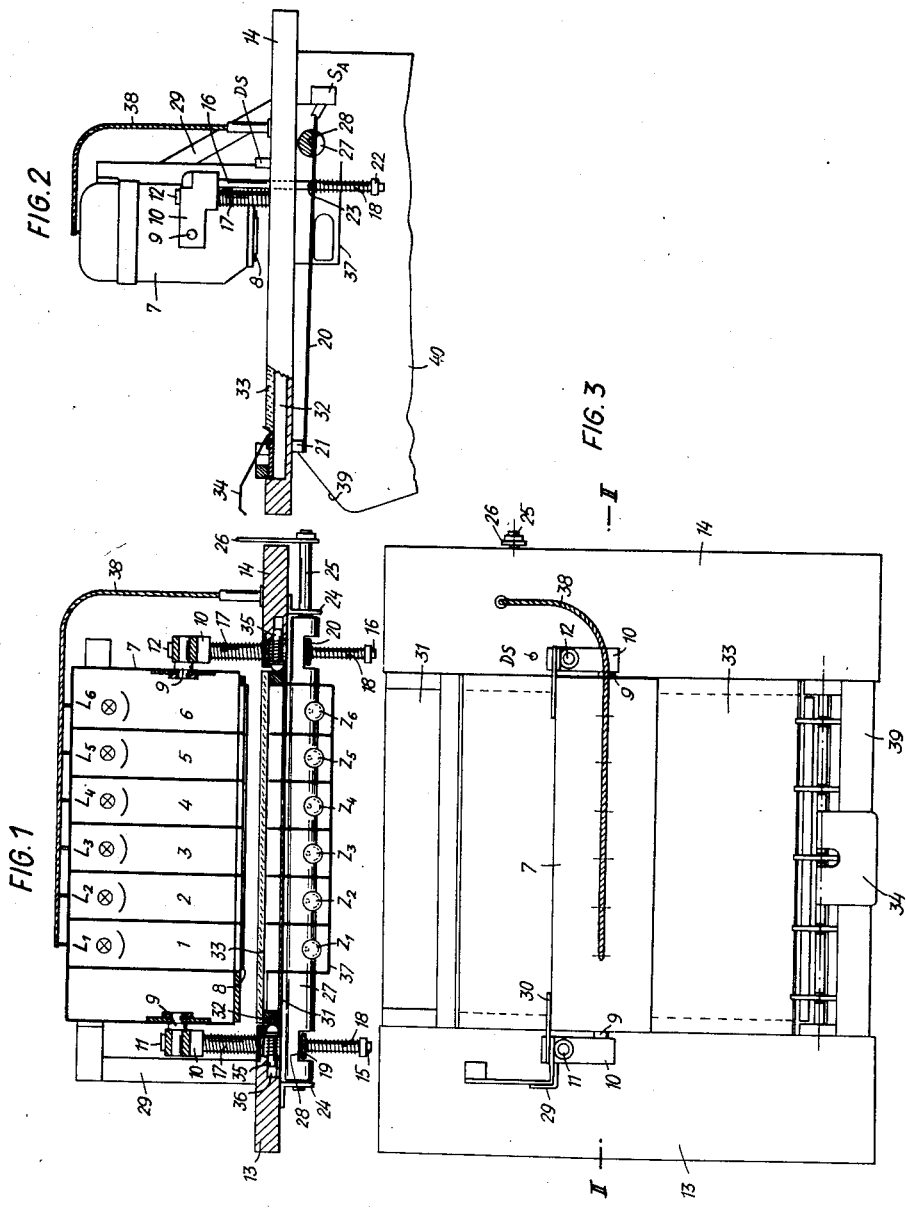
Sept. 27, 1960    K. HOFSTETTER    2,953,984
PHOTOGRAPHIC PRINTING APPARATUS
Filed Sept. 6, 1957    2 Sheets-Sheet 1
INVENTOR
KURT HOFSTETTER

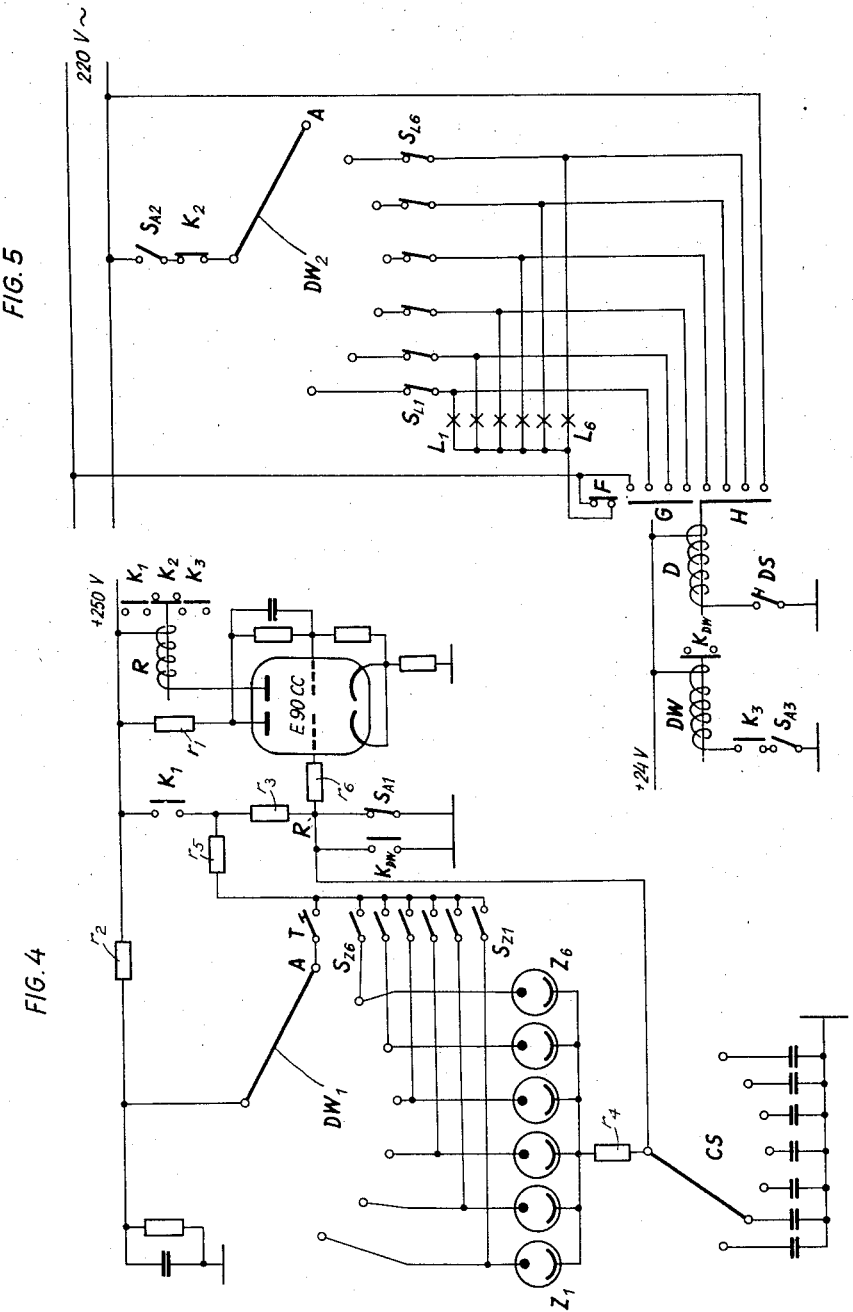

2,953,984
PHOTOGRAPHIC PRINTING APPARATUS

Kurt Hofstetter, Ried im Innkreis, Austria, assignor to Otto John Munz, Harness Creek, Annapolis, Md.

Filed Sept. 6, 1957, Ser. No. 682,472

Claims priority, application Austria Sept. 7, 1956

12 Claims. (Cl. 95—75)

This invention relates to photographic printing apparatus, particularly for making sheet prints.

In particular, this invention relates to the printing of photographic negatives of the smaller sized films which contain a large number of such negatives, and which are so popular with amateur photographers. The difficulty encountered in making photographic prints from these negatives arises from the fact that the negatives from the same roll of film are usually subjected to different rates of exposure by the photographer. As a result, some negatives may be underexposed while others have been exposed for too long a period of time. Therefore, a uniform light exposure time cannot be used to print the negatives.

Strip printing devices which enable an individual exposure of each print, are common, but very complicated and expensive. To obtain good pictures with present sheet printing devices it is necessary to make an exact estimate of the exposure time for each negative in the roll of film. This operation is very difficult with film having, for example, 36 negatives on each roll of film.

It is possible to measure the density of the negatives before or during the printing and thus to determine the exact exposure time. Experience has shown, however, that a working time of as much as an hour for a perfectly exposed sheet of 36 pictures must be expected. This time is much too long and uneconomical for firms concerned with such work.

In all usual devices the negative must be readjusted after each exposure. Therefore, sheet prints have not been successful in practice so far in spite of their important advantage of combining all pictures on a sheet of convenient size.

This invention provides a device which results in the printing of perfect sheet copies with relatively simple means within a greatly reduced working time, and which does not require each negative to be separately adjusted.

The invention contemplates a device which enables controlled exposure rapid printing of small-sized photographic negatives (such as the popular 35 mm. size or the like) in a series of successive rows on a single sheet of photographic printing paper. The device of the instant invention thereby represents an improvement over similar devices of the prior art in respect to customized printing exposure for each negative and vastly increased economy in that a great savings in both operational time required and quantity of printing paper utilized is effected. One of the objects of the invention is the provision of means for effecting rapidly succeeding or simultaneous row wise exposures with an automatically controlled exposure time. In order to achieve this, several, preferably six light chambers lying one beside the other and provided with separate lamps can be combined to form a pivotally movable lamp housing.

The invention also provides light chambers having extensions below a guide carriage carrying a glass plate wherein said extensions receive the photoelectric cells.

The pin supports of the lamp housing are slidably arranged on vertical bolts carried on the printing table top and movable against the action of springs which surround said bolts. The pin supports may have bolts affixed to them which extend through the printing table top and which are surrounded at their lower end by springs. Each spring is supported by a leaf spring or the like, which is pivotally movable by means of a lever connected thereto, so that the lever can be actuated to lower the lamp housing and to enable the film to be urged against the printing paper clamped on the glass plate of the guide carriage.

According to the invention the guide carriage may be provided with lateral notches spaced like the rows of the negatives and adapted to receive resilient bolts.

These means enable the printing means to print a row of pictures, then to shift to the next row, and thus to repeat the printing operation as often as there are rows of undeveloped negatives.

The invention also provides a rotary selector which connects successively each photoelectric cell to a source of voltage and to an adjustable capacitor system, and connects at the same time each successive light source to an electric supply. After the proper capacitor has been charged, one half of a double triode is blocked to interrupt the lamp current and advance the rotary selector.

The automatic adjustment of the exposure time is effected as follows:

The photoelectric cell supplies a current which depends on the amount of light that falls on the cell. The light from the lamp falls through the negative and the printing paper onto the photoelectric cell. For this reason the amount of incident light will depend on the density of the negative. The more dense the negative, the smaller will be the current of the photoelectric cell and the longer will be the time required for charging the capacitor. When the capacitor is compensated for in selecting values of capacitance for its charging time will be equal to the exact printing time of the print. In this connection the transparency of the negative is of little or no consequence. The various exposure factors of the different photographic papers are adjusted with the capacitor system.

The leaf spring actuated by the lever may be connected to a switch, which initiates simultaneous actuation of the switch incorporated into the grid leak of the double triode, the light current switch, and a switch included in the circuit of the relay of the rotary selector.

In accordance with one embodiment of the invention a relay may be provided which is connected to a source of direct current, and which can be energized to attract its armature whereby one third or half of all lamps, i.e., two or three of six lamps, are connected in parallel. The lamps within a group of two or three lamps are connected in series to be fed with a correspondingly reduced voltage. In this way the light is shifted toward the red region of the spectrum to a wavelength for which the photographic paper is insensitive. The arrangement makes use of the lamps, which are employed for printing, also for adjusting the physical position of the negatives without requiring a second, filtered source of light.

Other objects and many of the attendant advantages of this invention will be readily appreciated as the same becomes better understood by reference to the following detailed description when considered in connection with the accompanying drawings in which like reference numerals designated like parts throughout the figures thereof and wherein:

Figure 1 is a longitudinal sectional view of the automatic printer taken on line A—B of Figure 3.

Figure 2 is a side view, partly cut away, taken from the right side of the device as viewed in Figure 1.

Figure 3 is a top plan view of the device.

Figures 4 and 5 show diagrammatically the electrical system.

The optically separated light chambers 1–6 receive the low power incandescent lamps $L_1$–$L_6$, and comprise the lamp housing 7. Along the bottom of the light chambers, which is covered by masked windows, a continuous film guide 8 is attached. The size and spacing of the masked windows corresponds to the size and spacing of the negatives.

The lamp housing 7 is supported by two laterally spaced pins 9, which are rotatably mounted in pin supports 10. The pin supports are slidably mounted on bolts 11, 12, which are affixed to opposite sides of the bipartite table top 13, 14. The pin supports 10 are also connected to bolts 15, 16, which extend through the table top sections 13, 14. The bolts 11, 12, are surrounded by springs 17 which ride between the pin supports 10 and the table top sections 13, 14, and the bolts 15, 16, are surrounded by springs 18. The latter are restrained at their upper surfaces by leaf springs 19, 20, which are affixed at 21 to the table top sections 13 and 14, respectively. The springs 18 bear with their lower surfaces on discs 22 carried by the bolts 15 and 16, respectively. The leafsprings 19, 20, are urged by the springs 18 against crosspins 23 mounted on the bolts 15, 16.

A shaft 25 which is supported in bearings 24 is rotatably moved by a lever 26 and carries a cylinder 27, which is formed with recesses or flats 28 along the areas of the cylinder adjacent to the leaf springs 19, 20.

The table top section 13 carries a stop 29 engageable by a counterstop 30 affixed to the lamp housing 7.

A guide carriage 32 is slidable on a plate 31 between the two table top sections 13 and 14. The carriage is provided with a glass plate 33 and with a pivotally movable handle 34 for clamping the photographic paper applied to the glass plate 33. The guide carriage 32 has lateral notched recesses cut in the sides along its length which receive two bolts 35, which in turn are resiliently mounted on both sides of the carriage 32 in recesses 36 of the table top sections 13 and 14, respectively. The spacing of the notches corresponds to the row spacing of the prints.

Directly beneath the lamp housing 7 and below the glass plate 33 and the guide carriage 32 is a housing 37, which is firmly connected to the plate 31 and which is divided into six chambers corresponding to the light chambers 1–6. These chambers accommodate the photoelectric cells $Z_1$–$Z_6$. The lamps $L_1$–$L_6$ disposed opposite to said cells are supplied with current by a cable 38.

The free end of the leaf spring 20 is in engagement with a switch $S_A$ (Fig. 2). A pressure operable switch DS protrudes above the upper side of the table top section 14 (Figs. 2 and 3). The other switches to be described hereinafter are accommodated on the inclined wall 39 of the table frame 40.

With reference to the electrical diagram in Fig. 4, a relay R is connected to the positive pole of the a direct-current source of 250 volts. The relay R, is also connected to the right-hand anodes of an E90CC double triode. The direct-current source is connected through a resistor $r1$ to the left-hand anode of the double triode and through another resistor $r2$ to the contact finger of a rotary selector $DW_1$. The direct-current source is grounded through a switch $K_1$, a resistor $r3$, the junction P, and the switch $S_{A1}$.

Each of the six contacts of the rotary selector $DW_1$ is connected to a photoelectric cell $Z_1$, $Z_2$ ... $Z_6$, which cells are connected through a resistor $r4$ to a capacitor network CS. The second terminal of the latter is grounded. Six of the seven contacts of the rotary selector are connected to the switch $K_1$ through a switch $S_{Z1}$, $S_{Z2}$ ... $S_{Z6}$, respectively, and a resistor $r5$. The rest contact A of the rotary selector $SW_1$ is connected through the push button T in parallel to the switches $S_{Z1}$–$S_{Z6}$.

The left-hand grid of the double triode is connected through a resistor $r6$ to the junction P. The capacitor network CS is also connected to the junction P. The switch $K_{DW}$ is connected in parallel to the switch $S_{A1}$.

With reference to the electrical diagram in Fig. 5 the switch F, as well as a contact of a switch G, are connected to an alternating current supply, of e.g., 220 volts. The second terminal of the supply is directly connected to a contact of a switch H and is connected through switches $S_{A2}$ and $K_2$ to the rotary selector $DW_2$. The latter is mechanically (not shown in diagram) integrated with the rotary selector $DW_1$.

Each of the six contacts of the rotary selector $DW_2$ is connected by a switch $S_{L1}$, $S_{L2}$ ... $S_{L6}$ to one of the three still free contacts of each of the switches G and H. Each of these connections is further connected to an incandescent lamp $L_1$, $L_2$ ... $L_6$. The other terminal of these incandescent lamps is connected to the second contact of the switch F. Like the rotary selector $DW_1$, the rotary selector $DW_2$ has also a rest contact A. Each of the switches $S_{L1}$–$S_{L6}$ is coupled to the corresponding one of switches $S_{Z1}$–$S_{Z6}$.

Switches F, G, and H are simultaneously operated by a relay D, which is connected to a direct-current supply of 24 volts and is grounded through the aforementioned pressure operable switch DS. When the relay D is de-energized the switch F is closed whereas the switches G and H are opened.

The rotary selector relay DW is connected to the same of current as the relay D. The connection of said relay DW to ground includes a switch $K_3$ and a switch $S_{A3}$. Closing of these two switches causes an energization of relay DW, whereby $DW_1$ and $DW_2$ are advanced by one contact and $K_{DW}$ is closed at the same time. The method of operation of the rotary selector is as follows:

A pawl is attached to the armature of the relay DW and when the armature is attracted this pawl engages a ratchet wheel to advance the same by one tooth. The shaft of the ratchet carries the wipers of $DW_1$ and $DW_2$. Being rigidly connected to the ratchet wheel these wipers are operated by the rotary movement whereas $K_{DW}$ is actuated by lifting and lowering of the armature of the rotary selector relay DW. All contacts of the rotary selectors, including the rest contact, are evenly spaced around the full circle so that first operating contact succeeds directly the rest contact.

The switches $K_1$, $K_2$, and $K_3$ are simultaneously operated by the relay R. When $K_1$ and $K_3$ are open, $K_2$ will be closed, and when $K_1$ and $K_3$ are closed, $K_2$ will be open. The switches $S_{A1}$, $S_{A2}$, and $S_{A3}$ are mechanically combined to form the afore-mentioned switch $S_A$ as shown in Fig. 2. When $S_{A1}$ is open, $S_{A2}$ and $S_{A3}$ will be closed and when $S_{A1}$ is closed, $S_{A2}$ and $S_{A3}$ are open.

$S_{Z1}$–$S_{Z6}$ are open and $S_{L1}$–$S_{L6}$ are closed in the inoperative position of the rotary selectors.

To print, the lamp housing is moved vertically until the stop 29 is engaged by the stop 30. The film has previously been laid into the guide 8 while the lamp housing was in a horizontal position and the end of the film will coil up and engage the lamp housing 7.

When the direct current voltage source of plus 250 volts is energized the armature of the relay R will be permanently attracted whereby $K_1$ is opened, $K_2$ is closed and $K_3$ is opened.

The lamp housing is then lowered by a pivotal movement of lever 26, which turns the shaft 25 and the cylinder 27. The leaf springs 19, 20 are engaged by the round portion of the cylinder and compress the springs 18, which pull the bolts 15, 16 downwardly by means of the discs 22. The bolts 15, 16 carry the pin supports and housing 37 along against the action of the springs 17, and the copying paper, which is applied to the glass plate 33, is engaged by the film, which is urged against the paper by the film guide 8.

As the leaf spring 20 is pivoted it actuates the switch $S_A$. Thereby $S_{A1}$ is opened and $S_{A2}$ and $S_{A3}$ are closed. The wipers of the rotary selectors are on the respective rest contacts A. Pressing the push button T causes a short circuit, whereby the capacitor is disconnected and at the same time a positive voltage is connected to P. When the wipers have been advanced to the first operating contact the incandescent lamp $L_1$ is energized. Its light falls through the film negative, the photographic paper and the glass plate 33 onto the appertaining photoelectric cell $Z_1$. A voltage is supplied to the connected capacitor or capacitors of the capacitor network CS until the same has been charged. Thereby the left-hand system of the double triode is rendered conductive and the right-hand system becomes blocked so that the relay R drops out. As a result, $K_1$ is closed whereas $K_2$ is opened and $K_3$ is closed.

The opening of $K_2$ causes the deenergization of the lamp $L_1$. The closing of $K_3$ causes the rotary selector relay DW to be energized and to advance the rotary selector $DW_1$, $DW_2$ one stop. $K_{DW}$ is closed at the same time. As a result the capacitor is discharged and the grid of the left-hand system of E90CC becomes negative, whereby the tube current in the left-hand system is interrupted and the right-hand system is rendered conductive. Then the relay R attracts again, $K_1$ and $K_3$ are opened and $K_2$ is closed. The opening of $K_3$ causes the relay DW to become deenergized. $K_{DW}$ opens and the pawl of the armature of DW idles back owing to the ratchet teeth. The wipers of the rotary selector $DW_1$, $DW_2$ remain in the same position until the next response of DW.

$K_2$ and $S_{A2}$ being closed, the process is repeated as the photoelectric cell $Z_2$ is illuminated by means of the lamp $L_2$.

When the print is completed the lamp housing is lifted by swinging the lever 25 back to a vertical position. This causes the leaf springs 19, 20 to engage the flats 28 of the cylinder 27. The springs 17 and 18 relax and the leaf springs lift the bolts 15, 16 by means of the pins 23 so that the housing 7 is returned to the position of Figures 1 to 3.

The switch SA is actuated by the pivotal movement of the leaf springs 19, 20. Thus $S_{A1}$ is closed and $S_{A2}$ and $S_{A3}$ are opened.

Then the guide carriage 32 is advanced by one row. During this indexing operation the resiliently mounted bolts 35 are forced out of their previous notches and fall into the following set of notches in the guide carriage to present the work area with a row of undeveloped paper.

The lamp housing is now swung through 90 degrees to a position in which it depresses the pressure-operable switch (push button) DS, whereby relay D is caused to attract and establish a series connection of two groups of three parallel-connected lamps $L_1$, $L_2$, $L_3$ and $L_4$, $L_5$, $L_6$, which are then energized by half the normal voltage. After the lamps are supplied with the low voltage the film is fed forward until six undeveloped negatives are positioned in the work area.

As the lamp housing is swung back the pressure-operable switch DS is released to de-energize the lamps. Then the lamp housing is again moved to a vertical position and is lowered again in the manner described hereinbefore. The entire cycle is repeated until all horizontal rows have been printed, whereafter the photographic paper can be removed and developed.

Actuation of a switch pair $S_Z$–$S_L$ by closing $S_Z$ and opening $S_L$ will cause the corresponding negative to be skipped in the exposure. This enables rows of less than six pictures to be printed. These switch pairs are actuated by hand.

Instead of the mechanical rotary selector described an electronic counter may be employed for effecting the stepping movement, or six measuring systems may be provided and all six copies be exposed at the same time.

The row-wise exposure according to the invention may also be used to advantage with strip copies or transparency strips.

While specific voltage sources and an E90CC double triode have been used to describe the operation of the printing device it will be apparent that the basic concept allows the use of other energy sources and electrical equipment without being materially affected.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

I claim:

1. Photographic printing apparatus comprising a light-permeable support for light-permeable photographic printing material, a lamp housing forming a plurality of light chambers arranged one beside the other and open towards said support, a lamp in each of said light chambers and energizable to illuminate said photographic printing material, means for holding a plurality of light-permeable photographic negatives in a position in which each of said negatives is interposed between one of said lamps and a corresponding portion of said printing material, a plurality of photoelectric cells each of which is arranged to receive light from one of said lamps through the negative and printing material associated therewith, a capacitor network, an electric source, a rotary selector for successively connecting each of said lamps to said electric source and for connecting at the same time the photoelectric cell associated with said lamp to said capacitor network to cause said lamp to throw light through said negative onto said photoelectric cell and cause the latter to supply charging current to said capacitor network, and means responsive to a completely charged condition of said capacitor network to advance said rotary selector to connect the next of said lamps to said electric source and the next of the said photoelectric cells to said capacitor network.

2. Photographic printing apparatus as set forth in claim 1, in which said capacitor network is adjustable to match different degrees of light-permeability of said printing material.

3. Photographic printing apparatus as set forth in claim 1, which comprises a masked window formed at the end of each of said light chambers facing said support and a film guide disposed between said masked windows and said support and constituting said means for holding said negatives, which film guides extends throughout the length of said lamp housing.

4. Photographic printing apparatus as set forth in claim 1, which comprises a guide carriage, a glass plate carried by said guide carriage and forming said support, and a plurality of extension light chambers each of which is aligned with one of said light chambers and disposed on the opposite side of said support, each of said extension light chambers accommodating the photo-electric cell associated with the lamp in the light chamber aligned therewith.

5. Photographic printing apparatus as set forth in claim 1, which comprises a direct-current source, and a relay connectable to said direct-current source to connect said lamps in a series connection of groups of parallel-connected lamps to cause each lamp to be supplied with a reduced voltage and emit a light of a color displaced towards the red region of the spectrum for adjusting the negatives.

6. Photographic printing apparatus as set forth in claim 5, in which said lamp housing is pivotally movable between vertical and horizontal positions and which comprises a switch arranged to be closed by said lamp housing when the same is moved to said horizontal position to connect said relay to said direct-current source.

7. Photographic printing apparatus as set forth in claim 6, in which said switch comprises a push button.

8. Photographic printing apparatus comprising a light-permeable support for light-permeable photographic printing material, a lamp housing forming a plurality of light chambers arranged one beside the other and open towards said support, a lamp in each of said light chambers and energizable to illuminate said photographic printing material, means for holding a plurality of photographic negatives in a position in which each of said negatives is interposed between one of said lamps and a corresponding portion of said printing material, a plurality of photoelectric cells each of which is arranged to receive light from one of said lamps through the negative and printing material associated therewith, capacitor means, an electric source, means for connecting said lamps to said electric source and for connecting at the same time the photoelectric cell associated with each of said lamps to said capacitor means to cause said lamps to throw light through said negatives onto said photoelectric cells and cause the latter to supply charging current to said capacitor means, switch means responsive to a completely charged condition of said capacitor means connected to each of said photoelectric cells to deenergize the lamp associated with said photoelectric cell, bearing means for pivotally supporting said lamp housing, a table top carrying said support, vertical bolts carried by said table top, and springs surrounding said vertical bolts, said bearing means being slidably movable on said bolts against the action of said springs.

9. Photographic printing apparatus as set forth in claim 8, in which said support comprises a guide carriage and a glass plate carried thereby and which comprises additional bolts affixed to said bearing means and extending through and below said table top, additional springs surrounding said additional bolts below said table top, a plurality of pivoted leaf springs each of which supports one of said additional springs, and a lever for pivotally moving said leaf springs to lower said lamp housing whereby a film in said guide is urged against said printing material on said support.

10. Photographic printing apparatus as set forth in claim 9, in which said leaf springs engage rotary cylindrical members formed with flats and round portions and said lever is operable to rotate said cylinders and cause said springs selectively to engage said flats and said round portions of said cylindrical member.

11. Photographic printing apparatus as set forth in claim 9, in which said switch means comprise a rotary selector having a first wiper for successively connecting each of said lamps to said electric source and a second wiper connected for rotation with said first wiper for connecting at the same time the photoelectric cell associated with said lamp to said capacitor means, a double triode connected to said electric source and comprising two triode sections which are alternatively conductive and non-conductive responsive to the complete charges and less than completely charged conditions of said capacitor means, a grid leak connection for said double triode, a first switch included in said grid leak connection, a second switch between said electric source and said first wiper, a relay connected to one of said triode sections and energizable to cause said rotary selector to advance one step, a third switch in circuit with said relay, and a switch actuator operable by one of said leaf springs for actuating said first, second and third switches.

12. Photographic printing apparatus as set forth in claim 11, which comprises a fourth switch operable by said relay and connected in parallel to said first switch.

No references cited.